United States Patent
Chiu

(10) Patent No.: US 11,977,897 B2
(45) Date of Patent: May 7, 2024

(54) MOUNTING POSITION OF NVME OR SATA ON A BACKPLANE USING BAY SLOT ID

(71) Applicant: Lenovo (Beijing) Limited, Beijing (CN)

(72) Inventor: Tai-Yu Chiu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 211 days.

(21) Appl. No.: 17/551,853

(22) Filed: Dec. 15, 2021

(65) Prior Publication Data
US 2022/0300294 A1 Sep. 22, 2022

(30) Foreign Application Priority Data
Mar. 18, 2021 (CN) .......................... 202110291016.2

(51) Int. Cl.
*G06F 9/4401* (2018.01)
*G06F 3/06* (2006.01)
(52) U.S. Cl.
CPC .......... *G06F 9/4411* (2013.01); *G06F 3/0604* (2013.01); *G06F 3/0655* (2013.01); *G06F 3/0676* (2013.01)

(58) Field of Classification Search
CPC .... G06F 9/4411; G06F 3/0604; G06F 3/0655; G06F 3/0676
See application file for complete search history.

(56) References Cited

U.S. PATENT DOCUMENTS 9,477,295 B2 * 10/2016 Jreji ...................... G06F 1/3268

FOREIGN PATENT DOCUMENTS

CN 110427308 A * 11/2019 .............. G06F 11/32

* cited by examiner

*Primary Examiner* — Tammara R Peyton
(74) *Attorney, Agent, or Firm* — ANOVA LAW GROUP, PLLC

(57) ABSTRACT

An information processing method includes, when an electronic apparatus is booted, obtaining current parameter information of a target hard disk drive and sending the current parameter information to a baseboard management controller (BMC). The current parameter information of the target hard disk drive indicates current mounting position of the target hard disk drive on a backplane (BP).

16 Claims, 5 Drawing Sheets

MOUNTING POSITION OF NVME OR SATA ON A BACKPLANE USING BAY SLOT ID

CROSS-REFERENCE TO RELATED APPLICATION

This application claims priority to Chinese Patent Application No. 202110291016.2, filed on Mar. 18, 2021, the entire content of which is incorporated herein by reference.

TECHNICAL FIELD

The present disclosure generally relates to the electronic apparatus technology field and, more particularly, to an information processing method, an information processing device, and an electronic apparatus.

BACKGROUND

A non-volatile memory express (NVMe) hard disk drive (HDDs) and a serial advanced technology attachment (SATA) HDDs can be used on a baseboard management controller (BMC). The position of the NVMe HDDs or the SATA HDDs is fixed and cannot be changed randomly. The wiring is fixed and has to be correct. As such, once the installed hard disk or the mounting position is changed, the hard disk cannot be used effectively.

SUMMARY

Embodiments of the present disclosure provide an information processing method. The method includes when an electronic apparatus is booted, obtaining current parameter information of a target hard disk drive, and sending the current parameter information to a baseboard management controller (BMC). The current parameter information of the target hard disk drive indicates a current mounting position of the target hard disk drive on a backplane (BP).

Embodiments of the present disclosure provide an information processing device, including an acquisition module and a transmission module. The acquisition module is configured to obtain current parameter information of a target hard disk drive when an electronic apparatus is booted. The current parameter information of the target hard disk drive indicates a current mounting position of the target hard disk drive on the BP. The transmission module is configured to send the current parameter information to a BMC.

Embodiments of the present disclosure provide an electronic apparatus, including at least one BP, at least one hard disk drive, and a processor. Any of the at least one hard disk drive is mounted on any position of any of the at least one BP. The processor is configured to obtain current parameter information of a target hard disk drive when the electronic apparatus is booted and send the current parameter information to a BMC. The current parameter information of the target hard disk drive indicates a current mounting position of the target hard disk drive on the BP.

In the above technical solutions, compared to the existing technology, the present disclosure provides an information processing method, which is applied to an electronic apparatus with a hard disk drive. The method may include obtaining the current parameter information of the target hard disk drive when the electronic apparatus is booted. The current parameter information of the target hard disk drive may indicate the current mounting position of the target hard disk drive on the BP. The method may further include sending the current parameter information to the BMC. In this solution, when the electronic apparatus is booted, the current parameter information of the target hard disk drive mounted on the BP may be obtained in real-time. The current parameter information may indicate the current mounting position of the target hard disk drive on the BP. When the mounting position of the hard disk drive is changed, the BMC may also accurately determine the mounting position of the hard disk drive mounted on the BP. The hard disk drive can still be used effectively.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

The technical solutions of embodiments of the present disclosure are described in detail below in connection with the accompanying drawings of embodiments of the present disclosure. Apparently, described embodiments are some embodiments of the present disclosure rather than all embodiments. Based on embodiments of the present disclosure, all other embodiments obtained by those of ordinary skill in the art without creative efforts shall be within the scope of the present disclosure.

Figure 1:
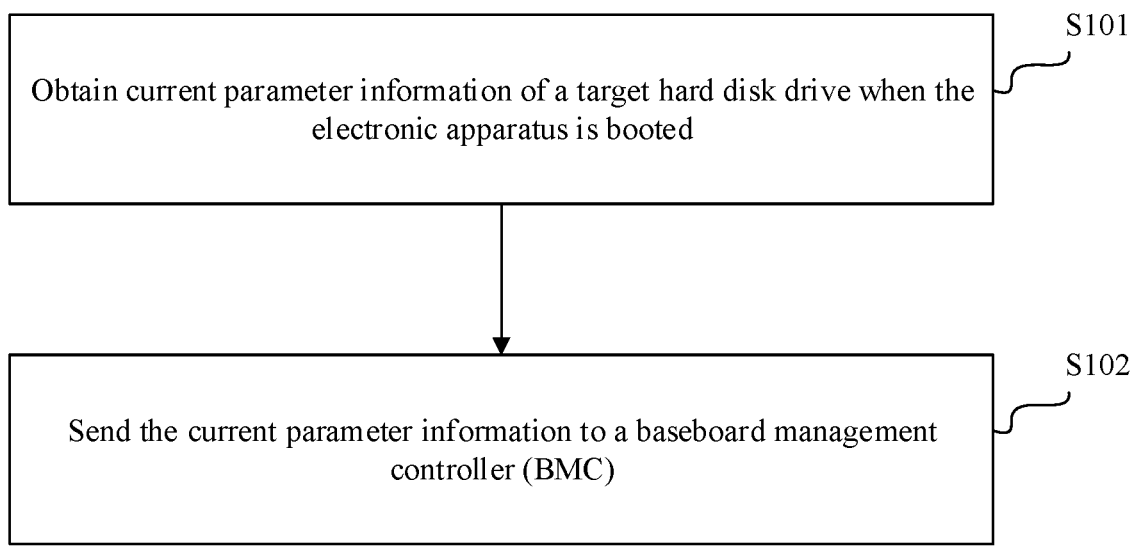
FIG. 1 illustrates a schematic flowchart of an information processing method according to some embodiments of the present disclosure.

FIG. 1 illustrates a schematic flowchart of an information processing method according to some embodiments of the present disclosure. The method may be applied to an electronic apparatus. The electronic apparatus includes a hard disk drive. The mounting position of the hard disk drive may be variable in the electronic apparatus. The method includes the following steps:

At S101, current parameter information of a target hard disk drive is obtained when the electronic apparatus is booted.

The current parameter information of the target hard disk drive may indicate a current mounting position of the target hard disk drive at a backplane (BP).

In some embodiments, the hard disk drive may include serial advanced technology attachment (SATA) hard disk drive (HDDs), non-volatile memory express (NVMe) HDDs, and etc.

The backplane (BP) of the electronic apparatus may include a plurality of mounting positions. The hard disk drive may be mounted at any mounting position, e.g., near BP, middle BP, or front BP.

Therefore, when the electronic apparatus is booted, by obtaining the parameter information of the target hard disk drive, the mounting position of the target hard disk drive on the BP may be determined based on the parameter information.

The process of obtaining the current parameter information of the target hard disk is described in detail in the subsequent specification and is not be described in detail here.

At S102, the current parameter information is sent to a baseboard management controller (BMC).

The current parameter information may be sent to the BMC, so that the BMC can determine the current mounting position of the target hard disk on the BP. Thus, functions such as subsequent signal transmission may be performed based on the mounting position.

In practical applications, since the hard disk drive does not change position during the operation of the electronic apparatus, the information processing method of the present disclosure may only need to be executed when the electronic apparatus is booted and may not need to be executed at other times.

In summary, the information processing method of embodiments of the present disclosure may be applied to the electronic apparatus, including a hard disk drive. The method may include obtaining the current parameter information of the target hard disk drive when the electronic apparatus is booted. The current parameter information of the target hard disk drive may indicate the current mounting position of the target hard disk drive on the BP. The method may further include sending the current parameter information to the BMC. In the solution, when the electronic apparatus is booted, the current parameter information of the target hard disk drive mounted on the BP may be obtained in real-time. The current parameter information can indicate the current mounting position of the target hard disk drive on the BP. When the mounting position of the hard disk drive is changed, BMC may also accurately determine the mounting position of the hard disk drive mounted on the BP. The hard disk drive may still be used effectively.

Figure 2:
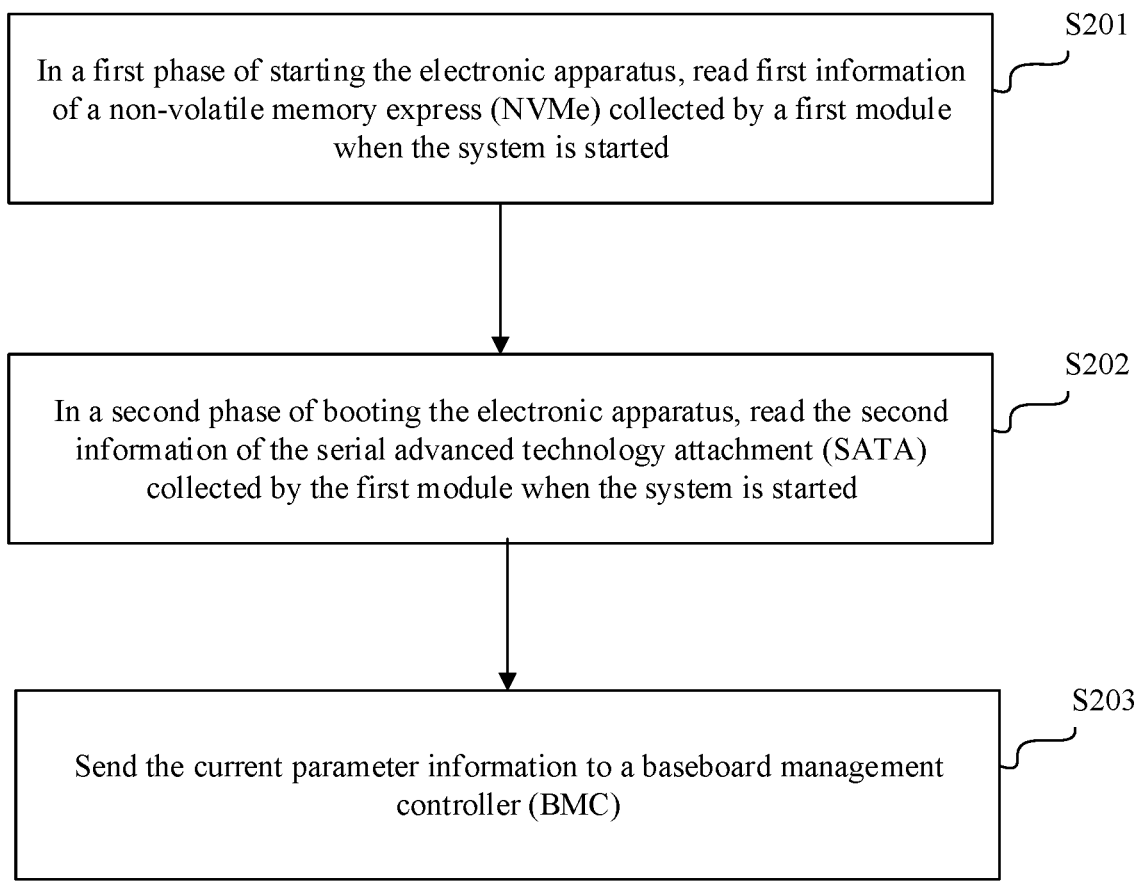
FIG. 2 illustrates a schematic flowchart of an information processing method according to some other embodiments of the present disclosure.

FIG. 2 illustrates a schematic flowchart of an information processing method according to some other of the present disclosure. The method includes the following steps.

At S201, in a first phase of starting the electronic apparatus, first information of NVMe collected by a first module when the system is started is read.

The first information may indicate the mounting position of the NVMe on the BP.

In some embodiments, the first information may include a bay ID. The bay ID may include a number of a slot on the BP where the NVMe is mounted. The slot arranged on the BP may be pre-numbered.

The electronic apparatus startup may include basic input output system (BIOS) power-on self-check and system startup.

In some embodiments, the BIOS power-on self-check may include a security (SEC) phase, a pre-EFI initialization environment (PEI) phase, a driver execution environment (DXE) phase, a boot device select (BDS), a transient system load (TSL), a RunTime (RT) phase, and after life (AL).

In some embodiments, during the startup of the electronic apparatus and the BIOS power-on self-check process, different structures and/or functions of the electronic apparatus may start at different phases. Therefore, the first information and the second information may be read at different phases.

In some embodiments, the first information of NVMe read from the first module may be in the PEI phase.

In some embodiments, the first information may be read based on an unified extensible firmware interface (UEFI).

The electronic apparatus related to the solution may include one or more BPs. A motherboard carrying the UEFI can be connected to the one or more BPs. That is, the UEFI may be connected to the one or more BPs to obtain the current parameter information of the hard disk drive mounted on the BP.

The first information may be collected by the first module through the bus when the system is started.

In some embodiments, the first module may use a Field Programmable Gate Array (FPGA).

When the system of the electronic apparatus is booted, the FPGA may collect the first information of the NVMe from the BP through I2C bus.

At S202, in a second phase of booting the electronic apparatus, the second information of the SATA collected by the first module is read when the system is started;

The second information may indicate the mounting position of the SATA on the BP.

In some embodiments, the second information may include a SATA bay ID. The SATA bay ID may include the number of the slot where the SATA is mounted on the BP.

In some embodiments, the second information of the SATA may be read from the second module in the DXE phase.

In some embodiments, the first module may collect the second information from the BP based on the serial general purpose input/output (SGPIO) protocol when the system is started.

In some embodiments, the first module (FPGA) may collect the second information of the SATA through the SGPIO when the system is started.

FPGA can only know the hardware circuit. Thus, the FPGA may collect hardware information (i.e., the first information) through I2C. The information such as the mounting position of the SATA hard disk drive is internal information of the SATA hard disk drive, which is software information. The FPGA cannot obtain the software information through the I2C bus. Thus, the software information may be obtained through the SGPIO.

In some embodiments, the solution of the present disclosure may be applied to the UEFI of the electronic apparatus. After the UEFI receives the second information, the second information may further be dynamically allocated and displayed in the UEFI.

At S203, the current parameter information is sent to the BMC.

Step S203 is consistent with step S102 in the above embodiments and is not repeated here.

In summary, in the information processing method of embodiments of the present disclosure, obtaining the current parameter information of the target hard disk drive may include reading the first information of the NVMe collected by the first module when the system is started in the first phase of booting the electronic apparatus. The first information may indicate the mounting position of the NVMe on the BP. Obtaining the current parameter information of the target hard disk drive may further include reading the second information of the SATA collected by the first module when the system is started in the second phase of booting the electronic apparatus. The second information may indicate the mounting position of the SATA on the BP. In the present solution, the electronic apparatus may read the first information of the NVMe and the second information of the SATA collected by and from the first module in different phases of booting the electronic apparatus. The electronic apparatus may perform collection based on an actual situation of booting electronic apparatus.

Figure 3:
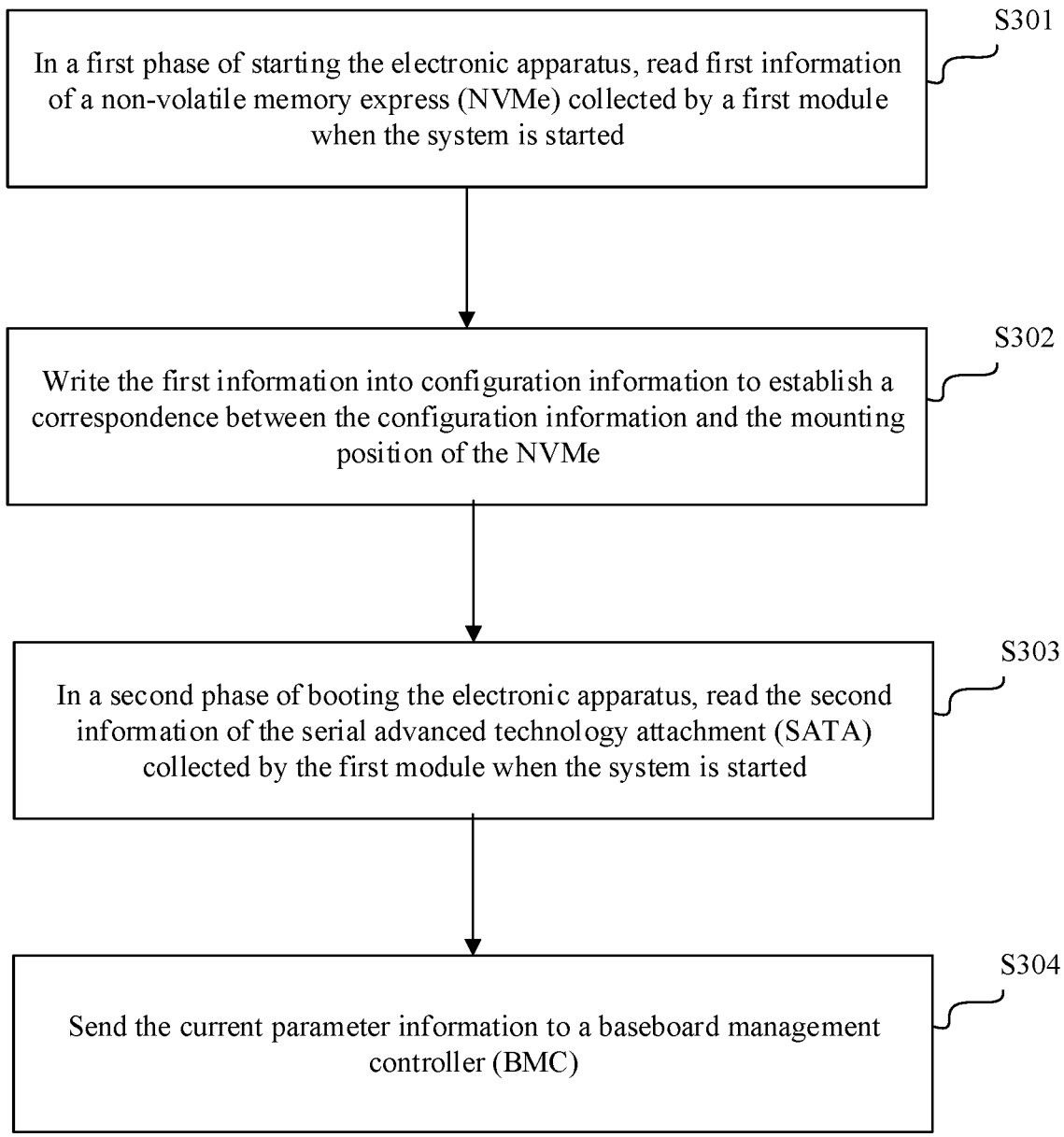
FIG. 3 illustrates a schematic flowchart of an information processing method according to some other embodiments of the present disclosure.

FIG. 3 illustrates a schematic flowchart of an information processing method according to some other embodiments of the present disclosure. The method includes the following steps.

At S301, in the first phase of booting the electronic apparatus, the first information of the NVMe collected by the first module when the system is started is read.

Step S301 is consistent with step S201 in the above embodiments and is not repeated here.

At S302, the first information is written into configuration information to establish a correspondence between the configuration information and the mounting position of the NVMe.

After the first information of the NVMe is obtained, the first information may be written into the configuration information to establish the correspondence between the configuration information and the mounting position of the NVMe.

In some embodiments, the configuration information may include peripheral component interconnect (PCI) configuration information. Thus, the first information may comply with the PCI specification so that the user may know where the NVMe is mounted on the BP.

In some embodiments, a table may be set to reflect the correspondence between the NVMe and the configuration information in the table.

In a subsequent application process, the correspondence may be represented in various forms so that the user may understand the mounting position of the NVMe on the BP. Then, the NVMe may be enabled/disabled by setting the parameters in the FPGA register.

At S303, in the second phase of booting the electronic apparatus, the second information of the SATA collected by the first module when the system is started is read.

At S304, the current parameter information is sent to the BMC.

Steps S303 and S304 may be consistent with steps S202 and S203 in the above embodiments and are not repeated here.

In summary, the information processing method of embodiments of the present disclosure may further include writing the first information into the configuration information to establish the correspondence between the configuration information and the mounting position of the NVMe. In the present solution, after the first information is obtained, the first information may be further written into the configuration information to establish the correspondence between the configuration information and the mounting position of the NVMe. Thus, the user may control the configuration information based on the correspondence to enable and disable the NVMe, which is convenient for the user to operate.

Figure 4:
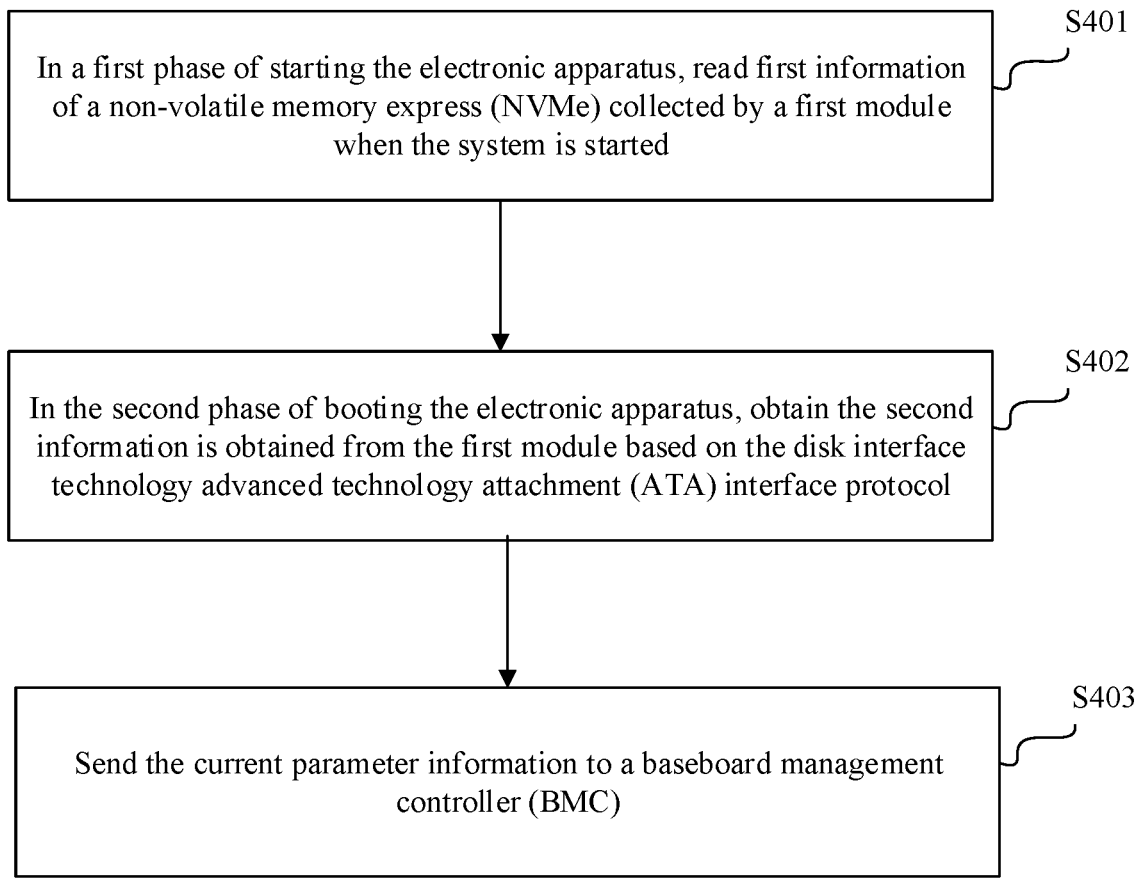
FIG. 4 illustrates a schematic flowchart of an information processing method according to some other embodiments of the present disclosure.

FIG. 4 illustrates a schematic flowchart of an information processing method according to some other embodiments of the present disclosure. The method includes the following steps:

At S401, in the first phase of booting the electronic apparatus, the first information of the NVMe collected by the first module when the system is started is read.

Step S401 is consistent with step S201 in the above embodiments and is not repeated here.

At S402, in the second phase of booting the electronic apparatus, the second information is obtained from the first module based on the hard disk interface technology advanced technology attachment (ATA) interface protocol;

Since the second information is the internal information of the SATA hard disk drive, the second information may be obtained from the first module based on the hard disk interface technology ATA interface protocol.

Since the second information is software information, the second information may be obtained from the FPGA based on the hard disk interface technology ATA interface protocol.

At S403, the current parameter information is sent to the BMC.

Step S403 is consistent with step S203 in the above embodiments and is not repeated here.

In summary, in the information processing method of embodiments of the present disclosure, reading the second information of the SATA collected by the first module when the system is started may include obtaining the second information from the first module based on the hard disk interface technology ATA interface protocol. In the present solution, the second information may be obtained by using the hard disk interface technology ATA interface protocol matching the type of the second information from the first module, which ensures that the second information can be accurately and effectively obtained and passed to the subsequent BMC.

In corresponding to information processing method embodiments of the present disclosure, the present disclosure further provides information processing device embodiments corresponding to the information processing method.

Figure 5:
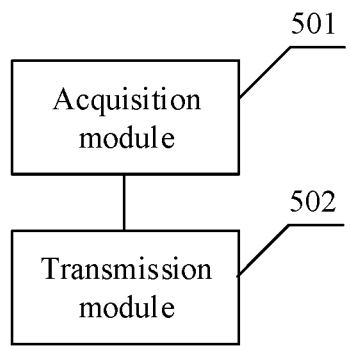
FIG. 5 illustrates a schematic structural diagram of an information processing device according to some embodiments of the present disclosure.

FIG. 5 illustrates a schematic structural diagram of an information processing device according to some embodiments of the present disclosure. The information processing device includes an acquisition module 501 and a transmission module 502.

The acquisition module 501 may be configured to obtain current parameter information of the target hard disk drive when the electronic apparatus is booted. The current parameter information of the target hard disk drive may indicate the current mounting position of the target hard disk drive on the BP.

The transmission module 502 may be configured to send the current parameter information to the BMC.

In some embodiments, the acquisition module may include a first acquisition unit and a second acquisition unit.

The first acquiring unit may be configured to read the first information of the NVMe collected by the first module when the system is started in the first phase of booting the electronic apparatus. The first information may indicate the mounting position of the NVMe on the BP.

The second acquiring unit may be configured to read the second information of the SATA collected by the first module when the system is started in the second phase of booting the electronic apparatus. The second information may indicate the mounting position of the SATA on the BP.

In some embodiments, the electronic apparatus may further include a configuration unit configured to write the first information into the configuration information to establish the correspondence between the configuration information and the mounting position of the NVMe.

In some embodiments, the second acquisition unit may be further configured to obtain the second information from the first module based on the hard disk interface technology ATA interface protocol.

In some embodiments, the first information may be collected by the first module through the bus when the system is started.

In some embodiments, the second information may be collected by the first module based on the SGPIO protocol when the system is started.

In summary, the information processing device of embodiments of the present disclosure includes the acquisition module configured to obtain current parameter information of the target hard disk drive when the electronic apparatus is booted. The current parameter information may indicate the mounting position of the target hard disk drive on the BP. The information processing device further includes the transmission module configured to send the current parameter information to the BMC. In the present solution, when the electronic apparatus is booted, the current parameter information of the target hard disk drive mounted on the BP may be obtained in real-time. The current parameter information may indicate the current mounting position of the target hard disk on the BP. When the mounting position of the hard disk drive is changed, the BMC may also accurately determine the mounting position of the hard disk drive mounted on the BP. The hard disk drive may still be used effectively.

In corresponding to information processing method embodiments of the present disclosure, the present disclosure provides electronic apparatus embodiments corresponding to the information processing method.

Figure 6:
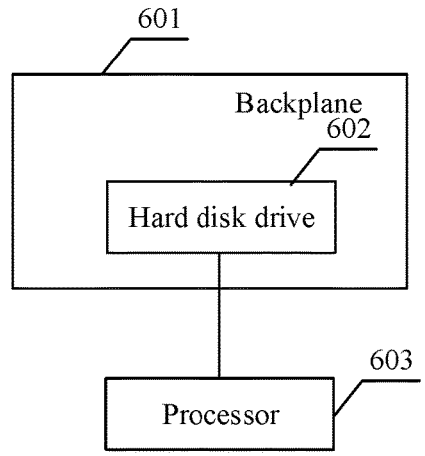
FIG. 6 illustrates a schematic structural diagram of an electronic apparatus according to some embodiments of the present disclosure.

FIG. 6 illustrates a schematic structural diagram of an electronic apparatus according to some embodiments of the present disclosure. The electronic apparatus includes at least one BP 601, at least one hard disk drive 602, and a processor 603.

Any of the at least one hard disk drive may be mounted in any position of any of the at least one BP.

The processor 603 may be configured to obtain the current parameter information of the target hard disk drive when the electronic apparatus is booted. The current parameter information of the target hard disk drive may indicate the current mounting position of the target hard disk drive on the BP. The processor 603 may be further configured to send the current parameter information to the BMC.

In FIG. 6, one hard disk drive on one BP is taken as an example for description. In some embodiments, the electronic apparatus may include a plurality of hard disk drives and a plurality of BPs.

In some embodiments, the processor obtaining the current parameter information of the target hard disk drive includes, in the first phase of booting the electronic apparatus, reading the first information of the NVMe collected by the first module when the system is started. The first information may indicate the mounting position of the NVMe on the BP.

The processor obtaining the current parameter information of the target hard disk drive further includes, in the second phase of booting the electronic apparatus, reading the second information of the SATA collected by the first module when the system is started. The second information may indicate the mounting position of the SATA on the BP.

In some embodiments, after the processor reads the first information of the NVMe collected by the first module when the system is started, the processor may be further configured to write the first information into the configuration information to establish the correspondence between the configuration information and the mounting position of the NVMe.

In some embodiments, the processor reading the second information of the SATA collected by the first module when the system is started includes obtaining the second information from the first module based on the hard disk interface technology ATA interface protocol.

In some embodiments, the first information may be collected by the first module through the bus when the system is started.

In some embodiments, the second information may be collected by the first module based on the SGPIO protocol when the system is started.

In summary, the electronic apparatus of embodiments of the present disclosure includes the BP, the hard disk drive, and the processor. The hard disk drive may be mounted at any position on the BP. The processor may be configured to obtain the current parameter information of the target hard disk drive when the electronic apparatus is booted. The current parameter information of the target hard disk drive may indicate the current mounting position of the target hard disk drive on the BP. The processor may be further configured to send the current parameter information to the BMC. In the present solution, when the electronic apparatus is booted, the current parameter information of the target hard disk drive mounted on the BP may be obtained in real-time. The current parameter information may indicate the current mounting position of the target hard disk drive on the BP. When the mounting position of the hard disk drive is changed, the BMC can also accurately determine the mounting position of the hard disk drive mounted on the BP. The hard disk drive may still be used effectively.

Figure 7:
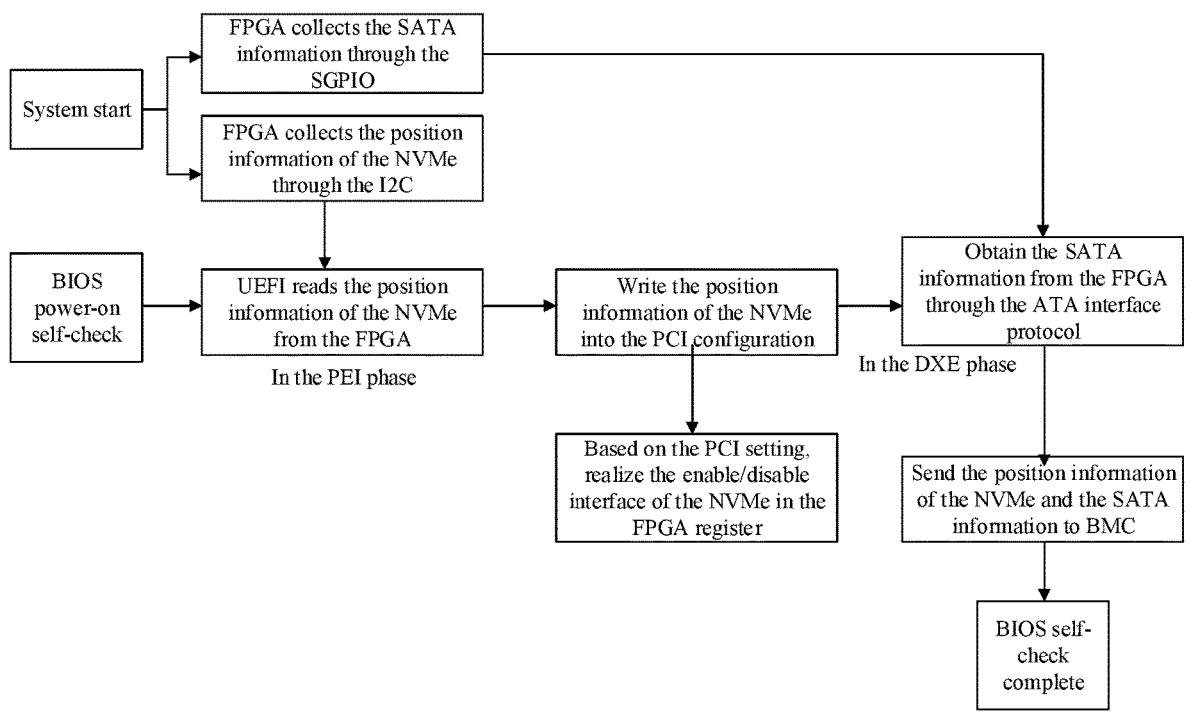
FIG. 7 illustrates a schematic block flowchart showing an application scene of the electronic apparatus according to some embodiments of the present disclosure.

In corresponding to information processing method embodiments of the present disclosure, the present disclosure further provides an application scene for applying the information processing method. FIG. 7 illustrates a schematic block flowchart showing an application scene of the electronic apparatus according to some embodiments of the present disclosure.

At S01, the system is started.

At S02: the FPGA collects the position information of the NVMe through the I2C.

At S03, the FPGA collects the SATA information through the SGPIO.

At S04, the BIOS power-on self-check is performed.

At S05, in the PEI phase, the UEFI reads the position information of the NVMe from the FPGA.

The position information of the NVMe is obtained through step S02.

At S06, the position information of the NVMe is written into the PCI configuration.

At S07, based on the PCI setting, the enable/disable interface of the NVMe is realized in the FPGA register.

At S08, in the DXE phase, the SATA information is obtained from the FPGA through the hard disk interface technology ATA interface protocol.

At S09, the position information of the NVMe and the SATA information are sent to BMC.

At S10, the BIOS self-check is completed.

Embodiments in the present specification are described in a progressive manner. Each embodiment focuses on the differences from other embodiments. The same or similar parts between embodiments of the present disclosure may be referred to each other. As for the device of embodiments of the present disclosure, since the device corresponds to the method of embodiments of the present disclosure, the description is relatively simple. The relevant part can be referred to the description of the method part.

The above description of embodiments of the present disclosure enables those skilled in the art to implement or use the present disclosure. Various modifications to embodiments of the present disclosure are obvious to those skilled in the art. The general principles defined in the specification may be implemented in other embodiments without departing from the spirit or scope of the present disclosure. Therefore, the present disclosure is not limited to the embodiments shown in this document, but should conform to the widest scope consistent with the principles and novel features provided in this document.

What is claimed is:

1. An information processing method comprising:
   when an electronic apparatus is booted, obtaining current parameter information of a target hard disk drive, the current parameter information of the target hard disk drive indicating current mounting position of the target hard disk drive on a backplane (BP), and obtaining the current parameter information of the target hard disk drive including:
   in a first phase of booting the electronic apparatus, reading first information of a non-volatile memory express (NVMe) collected by a first module when a system is started, the first information indicating the mounting position of the NVMe on the BP and including a bay ID, and the bay ID including a number of a slot on the BP where the NVMe is mounted; and
   in a second phase of booting the electronic apparatus, reading second information of a serial advanced technology attachment (SATA) collected by the first module when the system is started, the second information indicating the mounting position of the SATA on the BP and including a SATA bay ID, the SATA bay ID including a number of a slot on the BP where the SATA is mounted, and the second phase being different from the first phase; and
   sending the current parameter information to a baseboard management controller (BMC), the current parameter information including the bay ID or the SATA bay ID.

2. The method according to claim 1, further comprising, after reading the first information of the NVMe collected by the first module when the system is started:
   writing the first information into configuration information to establish a correspondence between the configuration information and the mounting position of the NVMe.

3. The method according to claim 1, wherein reading the second information of the SATA collected by the first module when the system is started includes:
   obtaining the second information from the first module based on a hard disk interface technology advanced technology attachment (ATA) interface protocol.

4. The method according to claim 1, wherein the first information is collected by the first module through a bus when the system is started.

5. The method according to claim 1, wherein the second information is collected by the first module based on a serial general input output (SGPIO) protocol when the system is started.

6. An information processing device comprising: an acquisition module configured to obtain current parameter information of a target hard disk drive when an electronic apparatus is booted, the current parameter information of the target hard disk drive indicating current mounting position of the target hard disk drive on the BP, and the acquisition module including: a first acquisition unit configured to read first information of a NVMe collected by a first module when a system is started in a first phase of booting the electronic apparatus, the first information indicating mounting position of the NVMe on the BP and including a bay ID, and the bay ID including a number of a slot on the BP where the NVMe is mounted; and a second acquisition unit configured to read second information of a SATA collected by the first module when the system is started in a second stage of booting the electronic apparatus, and the second information indicating mounting position of the SATA on the BP and including a SATA bay ID, the SATA bay ID including a number of a slot on the BP where the SATA is mounted, and the second phase being different from the first phase; and a transmission module configured to send the current parameter information to a BMC, the current parameter information including the bay ID or the SATA bay ID.

7. The device according to claim 6, further comprising:
   a configuration unit configured to write the first information into configuration information to establish a correspondence between the configuration information and the mounting position of the NVMe.

8. The device according to claim 6, wherein the acquisition module is further configured to:
   obtain the second information from the first module based on a hard disk interface technology ATA interface protocol.

9. The device according to claim 6, wherein the first information is collected by the first module through a bus when the system is started.

10. The device according to claim 6, wherein the second information is collected by the first module based on a SGPIO protocol when the system is started.

11. An electronic apparatus comprising:
    at least one BP;
    at least one hard disk drive, any of the at least one hard disk drive being mounted on any position of any of the at least one BP; and
    a processor configured to:
    obtain current parameter information of a target hard disk drive when the electronic apparatus is booted, the current parameter information of the target hard disk drive indicating current mounting position of the target hard disk drive on the BP, and obtaining the current parameter information of the target hard disk drive including:
    in a first phase of booting the electronic apparatus, reading first information of a non-volatile memory express (NVMe) collected by a first module when a system is started, the first information indicating the mounting position of the NVMe on the BP and including a bay ID, and the bay ID including a number of a slot on the BP where the NVMe is mounted; and
    in a second phase of booting the electronic apparatus, reading second information of a serial advanced technology attachment (SATA) collected by the first module when the system is started, the second information indicating the mounting position of the SATA on the BP and including a SATA bay ID, the SATA bay ID including a number of a slot on the BP where the SATA is mounted, and the second phase being different from the first phase; and send the current parameter information to a BMC, the current parameter information including the bay ID or the SATA bay ID.

12. The electronic apparatus according to claim 11, wherein the processor is further configured to:

write the first information into configuration information to establish a correspondence between the configuration information and the mounting position of the NVMe.

13. The electronic apparatus according to claim 11, wherein the processor is further configured to:

obtain the second information from the first module based on a hard disk interface technology ATA interface protocol.

14. The electronic apparatus according to claim 11, wherein the first information is collected by the first module through a bus when the system is started.

15. The electronic apparatus according to claim 11, wherein the second information is collected by the first module based on a SGPIO protocol when the system is started.

16. The method according to claim 1, wherein the first phase includes a pre-EFI initialization environment (PEI) phase, and the second phase includes a driver execution environment (DXE) phase.

* * * * *